Sept. 15, 1964 W. JUNG 3,148,815

BI-DIRECTIONAL TAPE DRIVE MECHANISM

Filed Sept. 14, 1962 5 Sheets-Sheet 1

INVENTOR.
Werner Jung
BY
C. A. Gullbrandsen
Atty.

INVENTOR.
Werner Jung
BY
C. A. Gulbrandsen
Atty.

Sept. 15, 1964 W. JUNG 3,148,815

BI-DIRECTIONAL TAPE DRIVE MECHANISM

Filed Sept. 14, 1962 5 Sheets-Sheet 3

INVENTOR.
Werner Jung
BY C. A. Gulbrandsen
Atty.

Sept. 15, 1964 W. JUNG 3,148,815

BI-DIRECTIONAL TAPE DRIVE MECHANISM

Filed Sept. 14, 1962 5 Sheets-Sheet 4

INVENTOR.
Werner Jung

BY
C. A. Gulbrandsen
Atty.

Sept. 15, 1964

W. JUNG 3,148,815

BI-DIRECTIONAL TAPE DRIVE MECHANISM

Filed Sept. 14, 1962

5 Sheets-Sheet 5

INVENTOR.
Werner Jung

BY C. A. Gulbrandsen
Atty.

3,148,815
Patented Sept. 15, 1964

3,148,815

BI-DIRECTIONAL TAPE DRIVE MECHANISM

Werner Jung, Morton Grove, Ill., assignor to Automatic Electric Laboratories, Inc., Northlake, Ill., a corporation of Delaware Filed Sept. 14, 1962, Ser. No. 223,612
8 Claims. (Cl. 226—50)

The present invention relates to the storage and transcription of intelligence signals on magnetic tape, and more particularly to a bi-directional drive mechanism for transporting said tape rapidly in fixed increments.

For many purposes it is desirable to store intelligence signals. For instance, in printing telegraph systems, a train of permutation code signals representing telegraph characters are often stored as perforations in a paper tape. Such a system has many inherent limitations. For example, paper tape can conveniently be used only once, operating room noise produced by the punching apparatus is often excessive and the speed of operation of the system is relatively limited.

It has heretofore been suggested to use magnetic tape for storage of a plurality of intelligence signals. Previous arrangements have, however, had a number of disadvantages. More particularly, continuously moving tapes, which have been used in prior arrangements, require a large length of tape in which to store a given amount of information. Continuously moving tape also makes stopping the tape at a desired point in the recording period difficult.

In an automatic printing telegraph switching center, a message comes in on an incoming line unit and the message is transmitted to an empty cross office unit. The cross office unit in turn sends the message to the outgoing line unit. When a high precedence message is received, it is sent to a cross office unit which in turn sends it immediately to the outgoing line unit. Therefore, if a lower precedence message is in the process of being transmitted from the outgoing line unit it is interrupted and the high precedence message goes out first. When the outgoing line unit is ready to receive the interrupted message, a person has to manually back up the interrupted message and get it started from the beginning again. This manual *Backing* up of the message in a cancelled transmission can now be eliminated by the use of the reversing mechanism of the present design.

Accordingly, it is an object of the invention to provide an improved system for storing a plurality of intelligence signals on a magnetic tape.

Another object is to provide an apparatus which is capable of carrying out information recording, storing, and reading operations simultaneously.

More particularly, it is an object of the invention to provide an improved drive mechanism for this information handling apparatus.

Further objects of the invention will appear from the following description.

For convenience, the invention will be described with reference to a five-unit permutation code telegraph system. However, it is to be understood that the invention is not limited to five-unit telegraph signals. The number of units may be more or less than five, as desired, and the signals need not be telegraph signals but may be of any other type, such as, for instance, signals employed in the operation of business and computing machines.

In accordance with the invention, the five-unit telegraph signals to be stored are recorded laterally across a magnetic tape in a direction substantially perpendicular to the direction of travel of the tape. A marking signal may be indicated by a recorded magnetic spot while a spacing signal may be indicated by the absence of a magnetic spot.

The spot recordings on the magnetic tape are made while the tape is stationary. Each group of spot combinations representing a telegraph character is spaced a given distance from the preceding group, the spacing being achieved by stepping the tape the given distance during the time interval between the recording of successive groups.

Transcription of the five-unit signals is accomplished by periodically stepping the tape past transcribing heads, voltages being induced in the transcribing heads in accordance with the spot combinations previously recorded on the tape. Each of the transcribing heads is connected to an individual amplifier. The amplified signals are employed to trip relays, locking tubes or semiconductors from normal spacing conditions thereof, to marking conditions in a well known manner.

The mechanism consists of, one ratchet wheel, one electric magnet, two armatures, two sets of driving pawls, and a latching mechanism. The magnet is so constructed and mounted that it is possible to operate an armature and a set of driving pawls from either end of the magnet.

The unit can operate from pulsating 48 v. D.C. or whatever voltage the coil is wound for. The latching mechanism latches one armature and immobilizes it so as not to permit it to pulse. The other armature mounted on the opposite side of the coil is free to pulse, which in turn drives the ratchet wheel through the driving pawls in one direction. Upon reversing, current is applied to the driving coil which cocks both armatures. The latching mechanism then is given an electrical pulse and it in turn, releases the armature formerly latched and latches the opposite armature. The current to the driving coil is released, the armature through the driving pawls causes the unit to take one step in the opposite direction. The unit continues to step in this direction until the cycle is repeated.

The latching mechanism consists of a solenoid, a shift lever and latch. When current is applied to the solenoid, the shift lever causes the latch to move in the opposite direction. Every time the solenoid is energized the latch will move in the opposite direction due to the operation of the shift lever.

The alternate form of drive mechanism differs in that it has two electromagnets in addition to the two armatures, and two sets of driving pawls.

Both driving magnets are energized at the same time and depending on the direction of rotation desired, a magnet is released and the unit takes one step in that direction. Upon reversing, the cycle is repeated and the other magnet is released and the unit takes one step in the reverse direction.

In a unit having two armatures and two sets of driving pawls, it would not be possible for it to operate unless one set of pawls were disengaged from ratchet wheel. In this unit, this is accomplished by a small fixed stud. This stud is so mounted that every time the driving magnets are energized and the armature is cocked, the pawls strike this stud and are cammed out of the ratchet wheel. Upon stepping of the unit, only one magnet is deenergized. This permits the armature to move down and away from the stud, thus allowing the pawls to re-enter the ratchet wheel to drive the unit one step.

The invention will now be described in greater detail with reference to the appended drawings in which.

Figure 1:
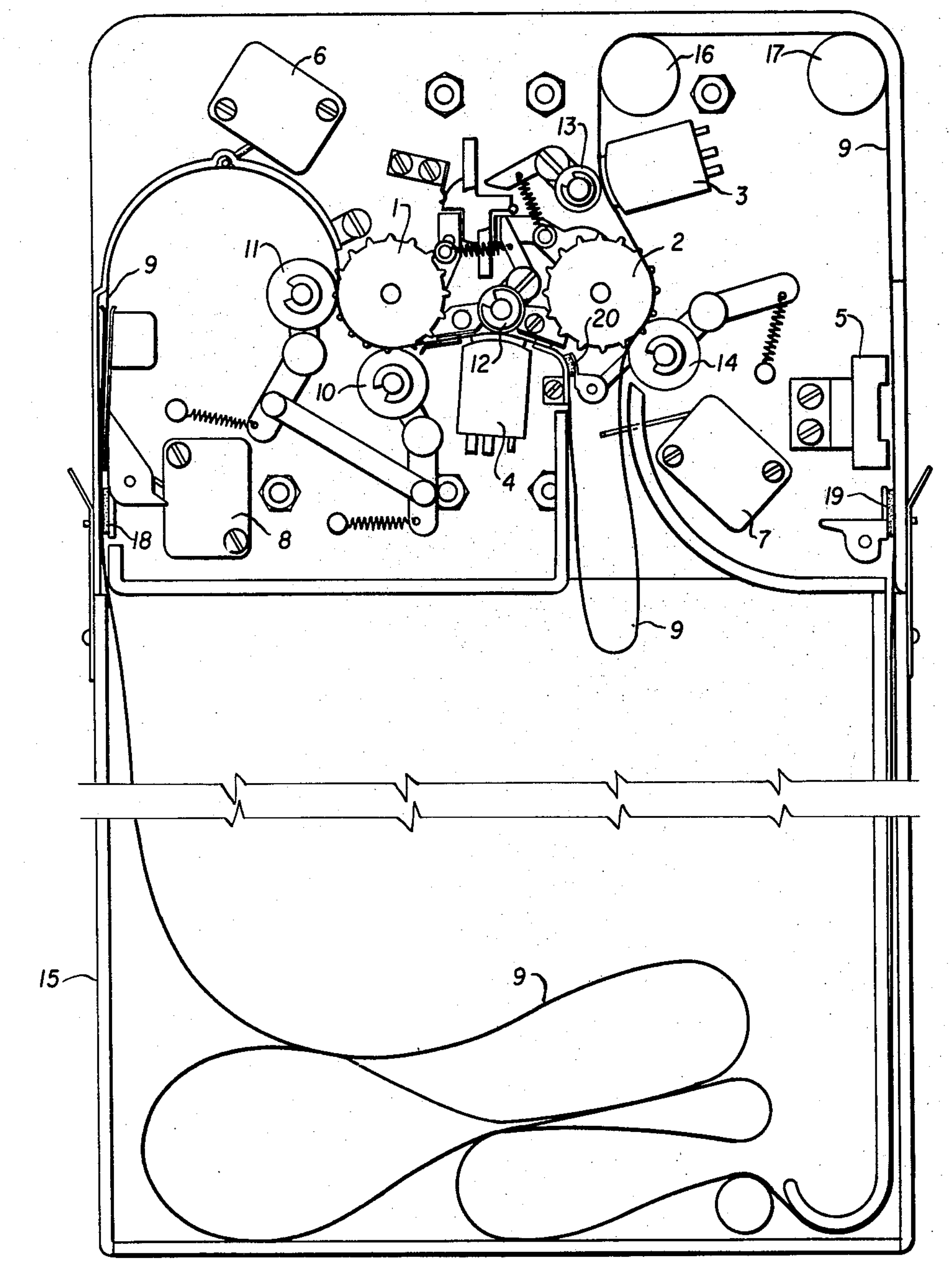
FIG. 1 illustrates a plan view of the complete information handling apparatus.
Figure 2:
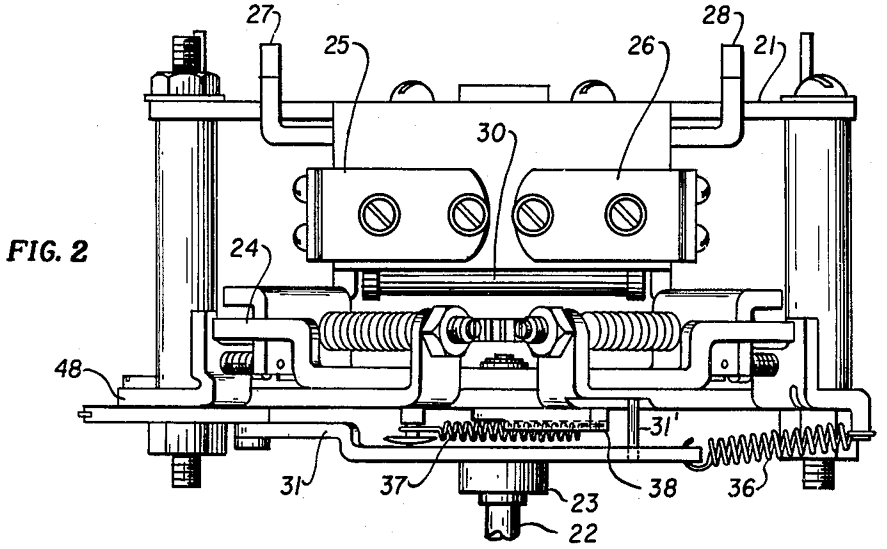
FIG. 2 is a top view of the assembled drive mechanism.
Figure 3:
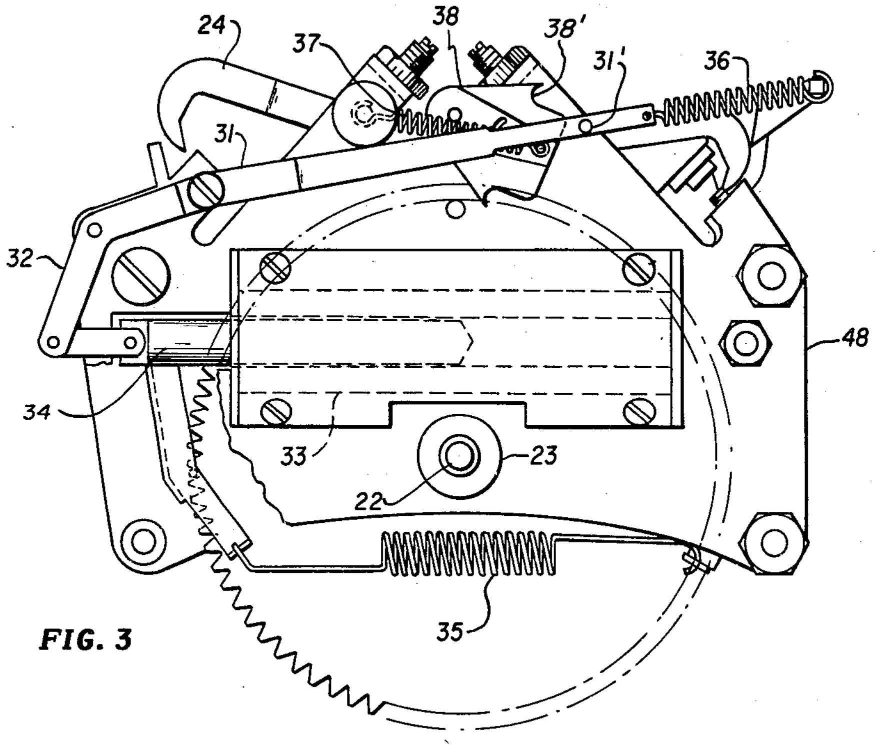
FIG. 3 is a frontal view of the drive mechanism.
Figure 4:
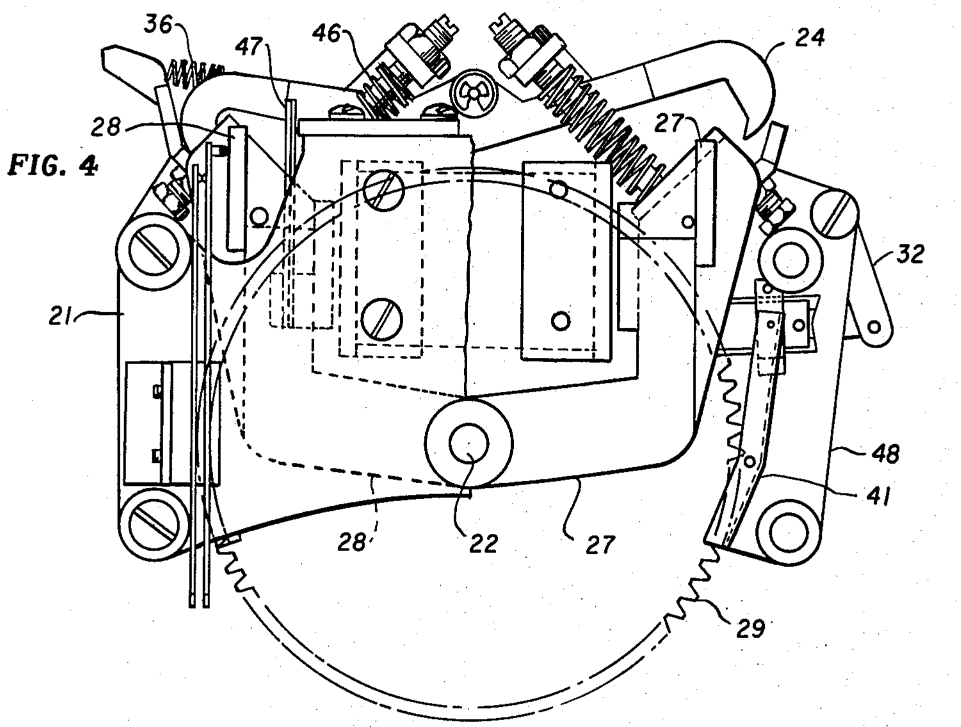
FIG. 4 is a rear view of the drive mechanism.

FIGURE 1 shows a plan view of the complete recorder. The path of the tape 9 along with the physical position of some of the components can be seen in the figure. The first component in the path of the tape as it leaves the bin 15 is the tape feed tension plate 19 followed by the permanent erase magnet 5. The tape is advanced by the record capstan 2 and its pressure roller 14 past the magnet, over the idler rollers 17 and 16, the record head 3 and its pressure roller 13 and into storage.

Since the tape is a continuous loop, it is possible that while recording without reading, the tape will begin to pull tight. The lever on the switch 8 is then pressed down by the tape and the switch closes giving an indication to correct the condition.

The read capstan 1 and its pressure rollers 10 and 11 pulls the tape out of storage and past the read head 4 with its pressure roller 12 and tension plate 20. As the tape is read, it re-enters the magazine passing its read tape tension plate 18. The lever is connected to switch 7 which closes when the tape storage loop begins to pull tight. This switch can also be used to apply a read pulse per character to the record motor, so that the end of a message can be read.

*Record Procedure*

The bits are presented to the input in parallel form, a negative voltage for a mark and ground for a space. The record pulse per character which advances the tape must be supplied by the source of the information. When the pulses per character is applied to the stepping circuit, the pulse cocks the indirect drive of the stepping motor. When the pulse is over, the mechanism is released and the tape is advanced. To record a mark as bit #1, the pulse is applied to the recorder head associated with the particular channel. The current through the head saturates the tape under the head. To record a space as bit #3, ground is applied and nothing is recorded on the tape. All bits are recorded at the time of the record pulse per character. At this time, the tape is standing still and the width of the bit on the tape is the gap width of the head.

*Read Procedure*

The recorded tape is then advanced by the read pulse per character, and the recorded marks and spaces approach the read head 4. To read, the tape must be moving; therefore, the marks occur after the read pulse per character. The read head 4 is adjusted so that the bits will pass the head with maximum velocity. The signal from the head is amplified and used to set a flip-flop. The flip-flop is later reset by the differentiated step of the next pulse per character. This occurs before the next bit. Bit #3 is a space, therefore, nothing is recorded, no signal is read out and the flip-flop is not set. The result is a space on the output.

*Stepping Motors*

The mechanism that gives the tape motion is the heart of the machine. There are two separate interchangeable stepping motors, one for each tape capstan. There is no continuously running motor in the units. The only source of power is a magnet coil 30 mounted between front frame 48 and on rear frame member 21. The motor is an indirect drive mechanism. The armatures 27, 28 are pulled up and then released to push the ratchet wheel 29. There is only one pivot point for the ratchet wheel 29 and the armatures. This is the shaft 22 mounted in the bushing 23. This means that regardless of the location of the pawls 43 and 44, it is always in the correct position relative to the tooth on the ratchet wheel 29. When the pawl hits the tooth and pushes it forward, it will fit perfectly when it enters and after it has advanced the wheel. This can only be accomplished by the two having the same pivot point. With this system, the resulting tighter fit practically eliminates most of the bouncing motion of the armature.

Figure 5:
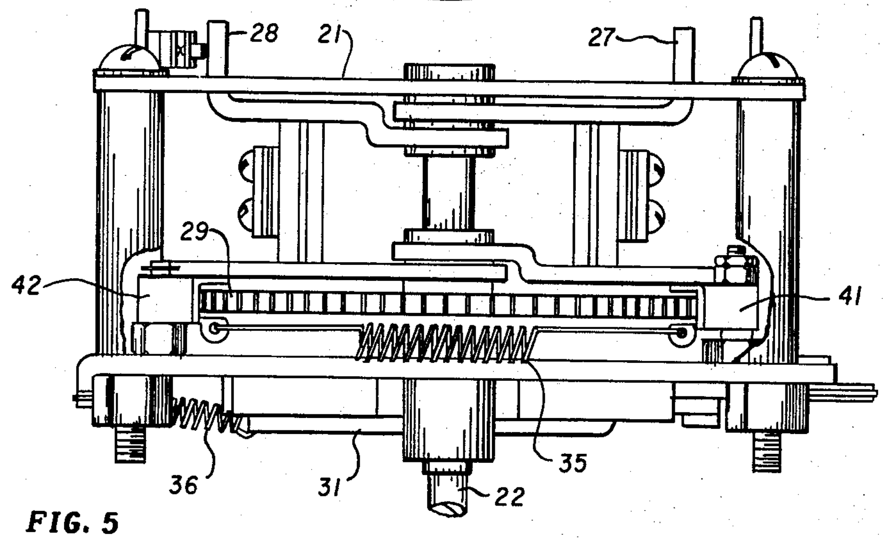
FIG. 5 is a bottom view of the drive mechanism.
Figure 6:
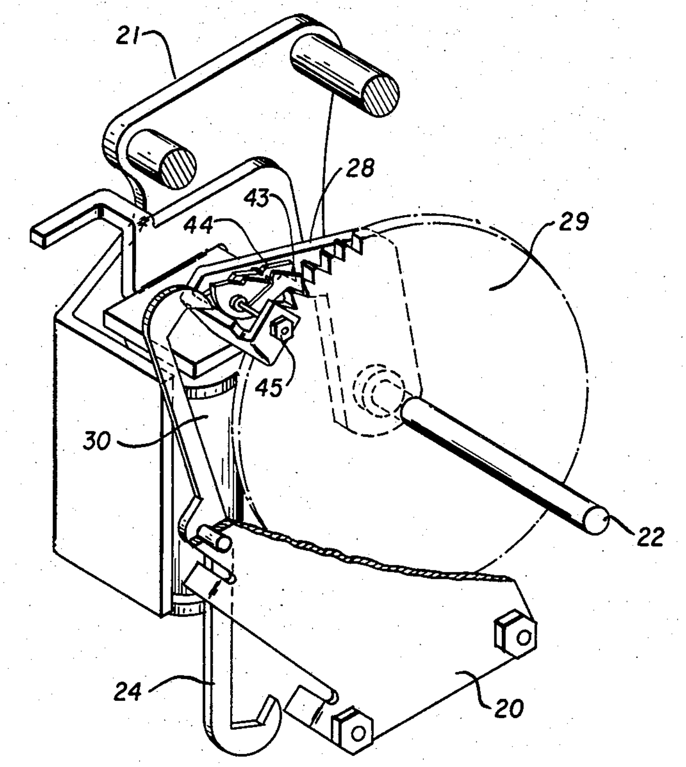
FIG. 6 is an exploded view disclosing the relative positions of the latch, armature and drive pawls.

The ratchet wheel has 75 teeth and two pawls 43 and 44 pivoted on pin 45 that give 150 increments per revolution by the use of two detents. The pawls index the wheel alternately by each taking a ½ step, thus eliminating the need for a 150 tooth wheel or a gear reduction train. The two pawls are clearly shown in FIGURE 6. The short one 43 is engaged in a tooth, and the long one 44 is half-way up the side of the next tooth. The distance between the points of the pawls is ½ the distance between the points of two adjacent teeth. The next time the armature 28 is cocked and released, the long pawl 44 will be where the short one is, and the short one will be half-way up its present tooth. After the pawls have indexed the ratchet wheel, the detents 41 and 42 and spring 35 (FIG. 5) hold the wheel in position. Since the wheel moves in ½ notch increments, one detent is in a tooth while the other is on a point. With the 150 steps a 3″ circumference capstan gives a modest 50 bits per inch with a separation of .020″.

The magnet is used to cock the pawls. As the magnet 30 clamps the armatures up, a coil spring 46 is compressed. Then as the air gap in the magnetic circuit is decreased and the force on the armature increases, two piece of clock spring 47 resting against bumpers 25 and 26 are displaced. When the coil is deenergized, the clock springs push the armature away decreasing the release time. The force vs. distance curve of this arrangement is closer to that of the clamping armature than any single compression spring. The description above applies to both types of stepping units. This reversible motor has two sets of pawls and two armatures on opposite sides of the ratchet wheel, one of which is held up depending on the direction.

The method of holding up the pawls can be done in two different ways depending on the application. One method employs FIGS. 2–6, a rocking mechanical latch 24. The magnet is so constructed and mounted that it is possible to operate an armature and a set of driving pawls from either end of the magnet. The latch positioning mechanism 38 clamps one armature and immobilizes it so it does not pulse. The other armature mounted on the opposite side of the coil is free to pulse and drives the ratchet wheel 29.

The latch 24 is actuated and held in position by a pin mounted in the over center latch assembly 38, which is held in position by spring 37. Latch assembly 38 is operated from one position of rest to another by the actuating shift lever 31 moving to the left (FIG. 3) against the tension of spring 36, the pin 31′ actuating one shoulder such as 38′ to rock the assembly 38 over to its second position. The shift lever 31 is operated from shift lever link 32 attached to solenoid plunger 34. Upon reversing, current is applied to the coil which cocks both armatures. Current is then applied to a small solenoid 33 connected to the latch 38 through solenoid plunger 34, and the armature formerly clamped is released, and the opposite armature is seized. The driving coil is then deenergized; the free armature is released and the wheel takes a step in the opposite direction. The motor continues to step in this direction until the cycle is repeated.

Figure 7:
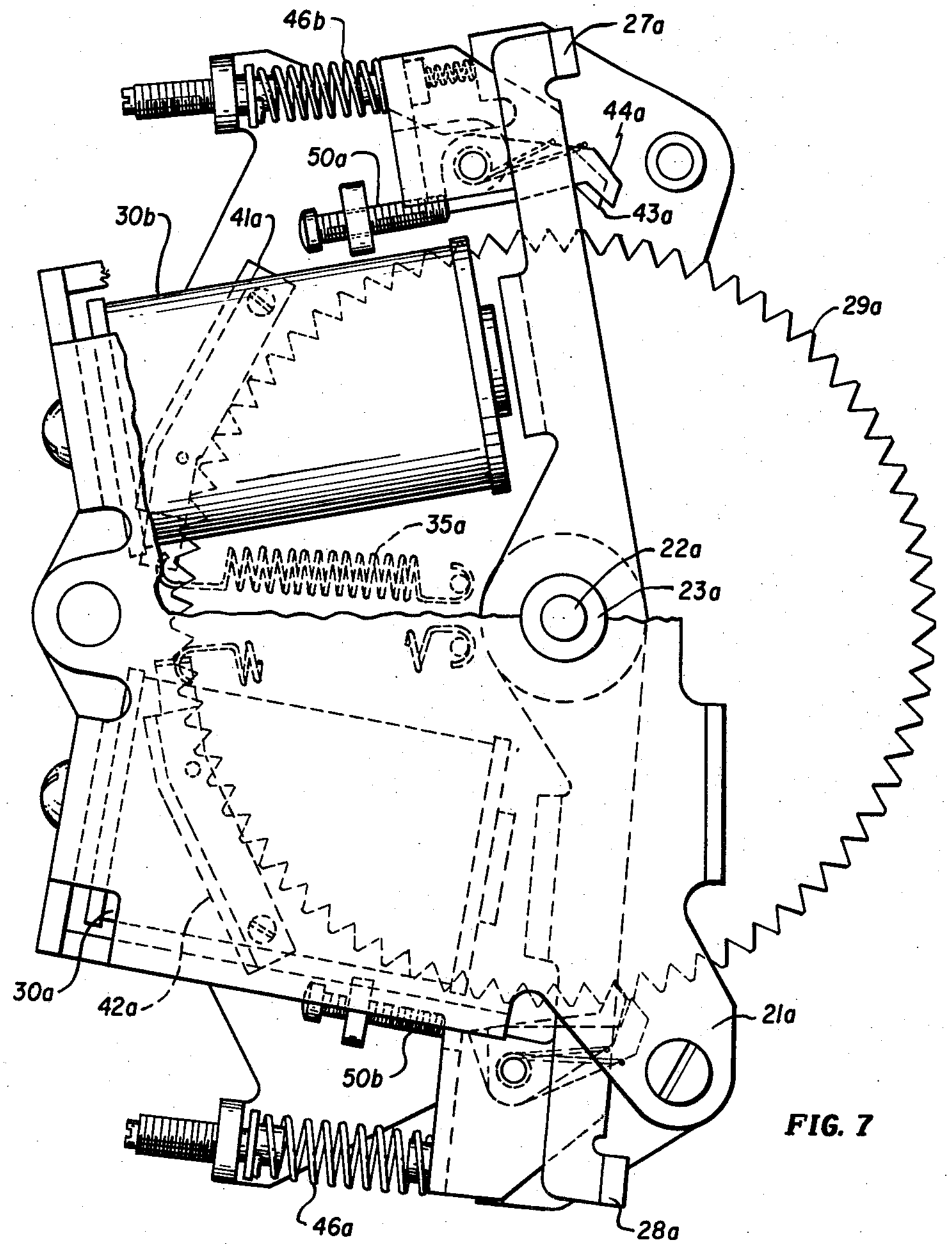
FIG. 7 is partially phantomed view disclosing an alternate form of the drive mechanism that utilizes two magnets.

The other method of reversing as shown in FIG. 7 does not use a mechanical latch. This method employs two separate driving coils 30*a* and 30*b*, one for each armature. One coil holds up its armature and pawls while the other one pulses. The pawls are held away from the ratchet wheel by bumper screws 50*a* and 50*b*. Once the armature is clamped up, the current in the coil can be reduced. Corresponding parts of the drive unit shown in FIG. 7 carry the same designations as those for the unit of FIGS. 2–7 suffixed by a letter.

While one embodiment of the invention has been disclosed, it will be understood that various modifications may be made therein, which are within the true spirit and scope of the invention.

What is claimed is:

1. A tape transport comprising: a supporting structure, a drive magnet mounted on said structure, a drive shaft journaled in said structure, a ratchet wheel secured to said shaft, a first and a second indent means mounted on said structure and alternately engaging said ratchet wheel to restrain it from free rotation, an armature assembly pivoted on said same shaft and including a first and a second ratchet wheel engaging pawl, means comprising the spacing of said pawls one-half the distance between the teeth on said ratchet wheel whereby only one or the other of said pawls can alternately drive said ratchet wheel, a drive spring mounted on said structure and operatively engaging said armature, and a tape drive capstan secured to said drive shaft and corotatable therewith, said magnet located parallel to a chord of said ratchet wheel, external pulse source means operated to successively energize and deenergize said magnet to operate said armature to compress said drive spring, said drive spring effective upon deenergization of said magnet to drive said armature, said first pawl effective to engage said ratchet wheel to drive said wheel one step, said second pawl effective to engage said ratchet wheel to drive said wheel another step upon a second deenergization of said magnet whereby said capstan is rotated a given radial distance for each release of said armature by alternate ones of said pawls.

2. A bi-direction tape transport comprising: a supporting structure, a drive magnet mounted on said structure, a drive shaft journaled in said structure, a ratchet wheel secured to said shaft, a first armature operatively associated with said magnet and pivotally mounted on said shaft, a second armature operatively associated with said magnet and pivotally mounted on said shaft, a drive spring operatively associated with each said armature, an armature latch having a first position to lock said first armature and a second position to lock said second armature, a tape drive capstan secured to said shaft, said magent located parallel to a chord of said ratchet wheel, said armatures so positioned as to each face an opposite pole of said magnet, a pawl on each said armature operated to engage said ratchet wheel upon release of said armature by said magnet and said latch and in response to the pressure of said drive spring to rotate said ratchet wheel one step.

3. A bi-direction tape transport comprising: a supporting structure, a drive magnet mounted on said structure, a drive shaft journaled in said structure, a ratchet wheel secured to said shaft, a first armature operatively associated with said magnet and pivotally mounted on said shaft, a second armature operatively associated with said magnet and pivotally mounted on said shaft, a drive spring operatively associated with each said armature, a ratchet engaging drive pawl mounted on each said armature in operative relationship with ratchet wheel, an armature latch having a first position to lock said first armature and a second position to lock said second armature, and control means responsive to external means to position said latch in said second position, a tape drive capstan secured to said shaft, said magnet located parallel to a chord of said ratchet wheel, said armatures so positioned as to each face an opposite pole of said magnet, pulse means effective to energize said magnet whereby both said armatures are operated to disengage said associated pawls from said ratchet wheel whereupon release by said magnet only said first armature and pawl are operated in response to the pressure of said drive spring to rotate said ratchet wheel one step in a first direction.

4. A bi-directional tape transport as claimed in claim 3 including a positioning means operated by said control means responsive to a subsequent external means to position said latch in said first position, said pulse means thereafter effective to energize said magnet to operate both said armatures to disengage said associated pawls from said ratchet wheel, upon release by said magnet only said second armature and pawl are operated in response to the pressure of said drive spring to rotate said ratchet wheel one step in a second direction.

5. A bi-direction tape transport comprising: a supporting structure, a drive magnet mounted on said structure, a drive shaft journaled in said structure, a ratchet wheel secured to said shaft, a first armature operatively associated with said magnet and pivotally mounted on said shaft, a second armature operatively associated with said magnet and pivotally mounted on said shaft, a drive spring operatively associated with each said armature, a first and a second alternately ratchet engaging drive pawls mounted on each said armature in operative relationship with said ratchet wheel, an armature latch having a first position to lock said first armature and a second position to lock said second armature, and control means responsive to external means to position said latch in said second position, a tape drive capstan secured to said shaft, said magnet located parallel to a chord of said ratchet wheel, said armatures so positioned as to each face an opposite pole of said magnet, pulse means effective to energize said magnet whereby both said armatures are operated to disengage said associated pawls from said ratchet wheel where, upon release by said magnet, only said first armature and pawl are operated in response to the pressure of said drive spring to rotate said ratchet wheel one step in a first direction, means including said pawls and said ratchet wheel whereby said ratchet wheel is driven through only that portion of a revolution corresponding to one-half the distance between the ratchets thereof.

6. A bi-direction tape transport comprising: a supporting structure, a drive magnet mounted on said structure, a drive shaft journaled in said structure, a ratchet wheel secured to said shaft, a first armature operatively associated with said magnet and pivotally mounted on said shaft, a second armature operatively associated with said magnet and pivotally mounted on said shaft, a drive spring operatively associated with each said armature, a first and a second alternately ratchet engaging drive pawl mounted on each said armature in operative relationship with said ratchet wheel, an armature latch having a first position to lock said first armature and a second position to lock said second armature, and control means responsive to external means to position said latch in said second position, said control means comprising a solenoid and plunger to alternately operate said catch from said first to said second position, a tape drive capstan secured to said shaft, said magnet located parallel to a chord of said ratchet wheel, said armatures so positioned as to each face an opposite pole of said magnet; pulse means effective to energize said magnet whereby both said armatures are operated to disengage said associated pawls from said ratchet wheel whereupon release by said magnet only said first armature and pawl are operated in response to the pressure of said drive spring to rotate said ratchet wheel one step in a first direction, means including said pawls and said ratchet wheel whereby said ratchet wheel is driven through only that portion of a revolution corresponding to one-half the arc separating two adjacent ratchets.

7. A bi-directional tape transport as claimed in claim 5 including a positioning means operated by said control means responsive to a subsequent external means to position said latch in said first position, said pulse means thereafter effective to energize said magnet to operate both said armatures to disengage said associated pawls from said ratchet wheel, upon release by said magnet only said second armature and pawl are operated in response to the pressure of said drive spring to rotate said ratchet wheel one step in a second direction.

8. A tape transport comprising: a support structure, a first and a second drive magnet mounted on said structure, a drive shaft journaled in said structure, a ratchet wheel secured to said shaft, a first and a second armature assembly pivoted on said same shaft and each including a pair of alternately ratchet wheel engaging pawls, first and second detent means mounted on said structure each in operative relationship to a pair of said pawls, a pair of drive springs mounted on said structure and operatively engaging each said armature, and a tape drive capstan secured to said drive shaft and co-rotatable therewith, external pulse source means operated to energize said magnets, and control means operated to retain said one magnet in the energized state, said first armature thereafter operated to move said pawls of said first armature into engagement with said first detent means, said points operated by said armature and detent to move out of engagement with said ratchet wheel, said second magnet upon deenergization effective to release said second armature, said armature thereafter driven by said drive spring to carry one of said pair of pawls into engagement with said ratchet wheel to drive said ratchet wheel in a first radial direction only one-half the distance between the sprockets of said ratchet wheel, the other of said pair of pawls after receipt of a subsequent pulse.

References Cited in the file of this patent

UNITED STATES PATENTS

| | | |
|---|---|---|
| 1,462,585 | Soreng | July 24, 1923 |
| 1,743,478 | Pratt | Jan. 14, 1930 |
| 2,377,733 | Waller | June 5, 1945 |
| 2,914,687 | MacDonald | Nov. 24, 1959 |
| 2,926,547 | Watson | Mar. 1, 1960 |

FOREIGN PATENTS

| | | |
|---|---|---|
| 685,032 | Great Britain | Dec. 31, 1952 |
| 1,191,751 | France | Apr. 13, 1959 |